No. 658,617. Patented Sept. 25, 1900.
J. CALLOW.
MACHINE FOR MOLDING DOUGH INTO LOAVES OF BREAD, PASTRY, &c.
(Application filed Nov. 14, 1899.)
(No Model.) 8 Sheets—Sheet 1.

FIG. I.

No. 658,617. Patented Sept. 25, 1900.
J. CALLOW.
MACHINE FOR MOLDING DOUGH INTO LOAVES OF BREAD, PASTRY, &c.
(Application filed Nov. 14, 1899.)
(No Model.) 8 Sheets—Sheet 2.

FIG. 2.

No. 658,617. Patented Sept. 25, 1900.
J. CALLOW.
MACHINE FOR MOLDING DOUGH INTO LOAVES OF BREAD, PASTRY, &c.
(Application filed Nov. 14, 1899.)
(No Model.) 8 Sheets—Sheet 3.

No. 658,617. Patented Sept. 25, 1900.
J. CALLOW.
MACHINE FOR MOLDING DOUGH INTO LOAVES OF BREAD, PASTRY, &c.
(Application filed Nov. 14, 1899.)
(No Model.) 8 Sheets—Sheet 5.

Witnesses
Inventor
John Callow

No. 658,617. Patented Sept. 25, 1900.
J. CALLOW.
MACHINE FOR MOLDING DOUGH INTO LOAVES OF BREAD, PASTRY, &c.
(Application filed Nov. 14, 1899.)
(No Model.) 8 Sheets—Sheet 6.

No. 658,617. Patented Sept. 25, 1900.
J. CALLOW.
MACHINE FOR MOLDING DOUGH INTO LOAVES OF BREAD, PASTRY, &c.
(Application filed Nov. 14, 1899.)
(No Model.) 8 Sheets—Sheet 7.

Witnesses
Inventor John Callow
By Mason Fenwick Lawrence
his attys

THE NORRIS PETERS CO., PHOTO-LITHO., WASHINGTON, D. C.

No. 658,617. Patented Sept. 25, 1900.
J. CALLOW.
MACHINE FOR MOLDING DOUGH INTO LOAVES OF BREAD, PASTRY, &c.
(Application filed Nov. 14, 1899.)
(No Model.) 8 Sheets—Sheet 8.

Witnesses
Allan W. Fuss
T. Redclift

Inventor
John Callow.
By Mason Fenwick & Lawrence
his Attys.

UNITED STATES PATENT OFFICE.

JOHN CALLOW, OF LIVERPOOL, ENGLAND.

MACHINE FOR MOLDING DOUGH INTO LOAVES OF BREAD, PASTRY, &c.

SPECIFICATION forming part of Letters Patent No. 658,617, dated September 25, 1900.

Application filed November 14, 1899. Serial No. 736,986. (No model.)

*To all whom it may concern:*

Be it known that I, JOHN CALLOW, a subject of the Queen of Great Britain, residing at Liverpool, in the county of Lancaster, England, (whose post-office address is 33 William Henry street, Liverpool,) have invented certain new and useful Improvements in Machines for the Molding of Dough into Loaves of Bread, Pastry, or the Like, (which invention has been patented to me in England, No. 8,328, filed April 20, 1899,) of which the following is a specification.

This invention relates to the molding or shaping of dough into loaves of bread or to the shaping of fancy bread or pastry, and has for its object the effecting of same by mechanical means in an expeditious and economical manner.

Referring to the accompanying drawings, Fig. 2, Sheet 6, a fragmentary detail view of a part of one of the supporting-bars with two trays thereon.

Figure 18:
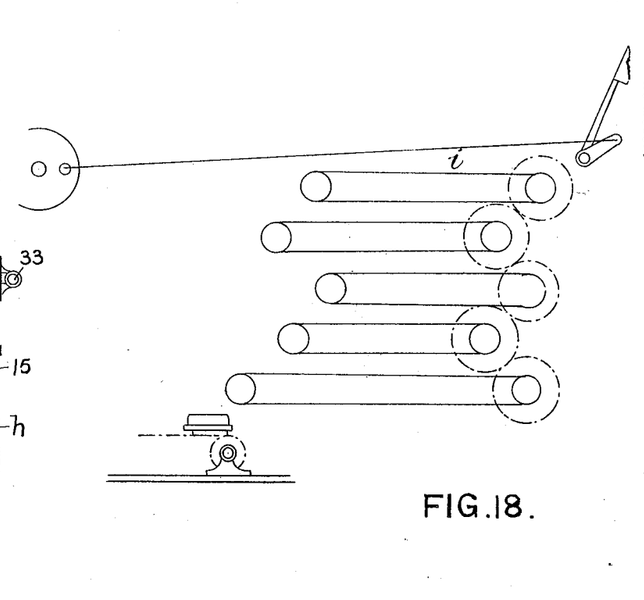
Fig. 18, a diagrammatic view of a device which may be used in conjunction with Fig. 1 to give time for the dough to aerate or prove after the squeezing action of the rollers.

In the drawings, $a$ represents the compressing-rolls, of ordinary construction, whereby the dough is drawn out into a sheet of uniform thickness. As the dough comes from these rollers it is fed onto a sloping board $b$. Between this sloping board and the molding-machine are a series of circular, square, or otherwise shaped cutters $c$, fixed on a shaft $d$, a reciprocatory circular movement being imparted to the cutters by means of a crank $e$, rod $f$, and arm $g$. These cutters as the sheet of dough is fed down the sloping board $b$ cut out each a lump of dough of a given size and weight and deposit it, as shown in dotted lines, on trays or bowls $h$ to be molded in a manner hereinafter described. In order to give the dough time to aerate or prove after leaving the rolls, I may place between the cutters and the molder a series of endless bands $i$, Fig. 18. The dough being deposited on the first band, it is conveyed to each band in succession, finally dropping onto the trays $h$ of the molder. Any fragments of dough left by the cutters are carried by a worm or belt and elevator (not shown) back to pass again through the rollers.

Figure 11:
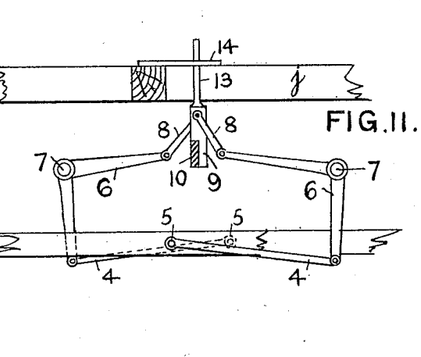
Fig. 11, a view of the mechanism for imparting a reciprocatory movement to a frame hereinafter described.
Figure 12:
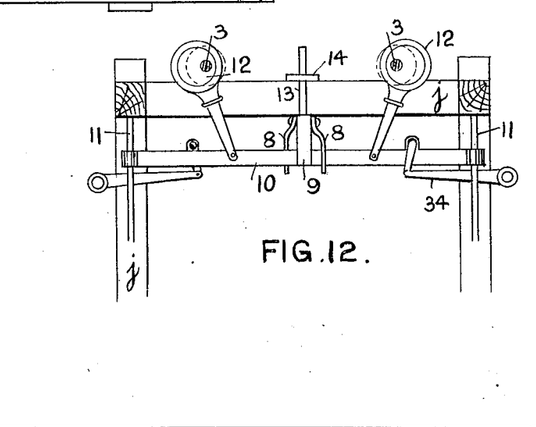
Fig. 12, a view at right angles to Fig. 11 of other mechanism hereinafter described.
Figures 13, 14, 15, 16, 17:
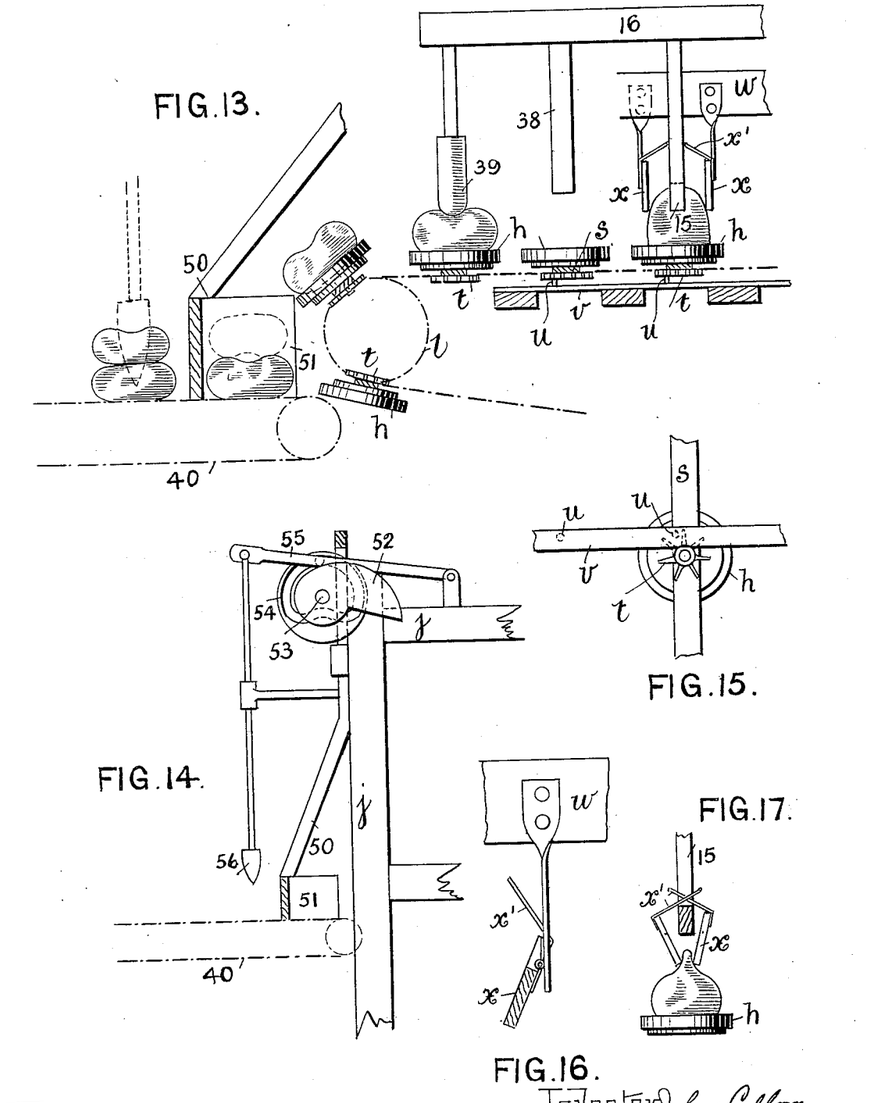
Fig. 13, an enlarged side view of a portion of the delivery end of the machine.
Figs. 14, 15, 16, and 17, details of parts of the machine not shown in the other figures for the sake of clearness.

The molder itself consists of a strong frame $j$, provided with a traveling carrier $k$, formed of an endless band of jointed laths or a chain, preferably the latter. This chain, which carries rotatable trays or bowls $h$, runs on sprocket-wheels $l$ and has imparted to it an intermittent movement by gear-wheel $m$, ratchet-pawl $n$, connecting-rod $o$, crank $p$, and gearing $q$, driven from main driving-pulley $r$; but any other equivalent mechanism may be used. The bowls $h$ are fixed to the chain $k$ by means of cross-bars $s$, Figs. 13 and 15. Toothed wheels $t$ are also attached to the bowls $h$, which wheels $t$ as they travel forward with the bowls engage with fixed pins $u$, fixed on the framework, preferably by means of iron bars $v$, and turn the bowls on their axes through part of a revolution. In the case of certain classes of bread it is found advisable not to rotate the bowls, this being readily effected by removing the bars $v$. Above the traveling bowls are moving frames $w$, having attached thereto a series of strips $x$ of wood or other suitable material extending right across the machine, alternate strips or laths being attached to the same frame. To these frames a horizontal reciprocating motion is imparted, by which the strips or laths *x* are so actuated that the couples open and close alternately, the laths attached to one frame alternately traveling toward and away from those attached to the other frame. Simultaneously with the horizontal movement a vertical movement is given to the frames, causing the laths to rise and fall as they are approached to or carried away from each other. By this means a resultant motion of the laths in the path of any desired curve may be obtained, which will cause them to shape dough or other material placed on the bowls as may be desired. I have found that I get better results by hinging the laths *x* to the brackets from which they are suspended, as shown in Figs. 13, 16, and 17, and by attaching to such laths projecting strips *x'*, which when the rams 15 ascend are struck, thereby causing the laths to assume the position shown in Fig. 17. The horizontal and vertical movement of these frames is effected as follows, reference being had more particularly to Figs. 1, 3, 4, 11, and 12: The frame consists of pairs of parallel pieces, the number of pairs being determined by the width of the machine, in this case two being shown. Passing through each frame *w* are stout cross-pieces *y*, to which are attached vertical rods *z*, fixed to cross-pieces 1, which latter are raised or lowered by cams 2, keyed on the shafts 3, the horizontal movement being given to each pair of frames by means of rods 4, Fig. 11, pivoted one to each longitudinal bar at 5, their free ends being attached to bell-crank levers 6, keyed on shafts 7. Links 8 connect the bell-crank lever with a vertically-reciprocating block 9, the latter being fixed to a cross-piece 10, which is guided by rods 11, Fig. 12, and actuated by eccentrics 12, keyed on shafts 3. 13 is a guide-rod, and 14 a guide-plate, for the block 9. Owing to this combined movement the dough or other material will receive a series of squeezes as it travels along and being partially rotated after each operation, as before described, will receive pressure on all sides. At a certain point in this squeezing operation each lump of dough receives a blow or pressure from above by means of a ram 15, there being a series of such rams corresponding to the numbers of rows of bowls. These rams are carried by a frame 16, suspended from cross-pieces 17, which are actuated by cams 18, so as to rise and fall in a similar manner to the frame *w*. 19 are guide-rods for both frames *w* and 16. As each row of bowls, with the dough thereon, arrives near the end of the molder it is operated upon by a special apparatus 20, (shown more particularly in Figs. 7, 8, 9, 10, 19, and 20,) which comprises a number of square molds 21, corresponding to the number of pieces of dough, the sides of such molds being opened out or closed in, as required, so as to enlarge or reduce the size of each square. As the dough arrives underneath this frame of molds the latter is lowered, whereby each piece of dough is inclosed on all sides by the mold, the sides forming the square being opened or drawn out to completely surround the dough on each tray or bowl. By means of mechanism hereinafter described the squares are then gradually reduced in size, and the frame being raised simultaneously gives the desired shape to the dough. The advantage of this arrangement is that the pieces of dough are operated upon on all sides at once, which is a decided advantage over the method before described of squeezing the dough on one side only and then passing it on to the next to be squeezed on another side. In fact, as these square molds do the same work as all the others combined the latter could be dispensed with; but as they serve the purpose of pressing out the gases I therefore retain them.

Figure 1:
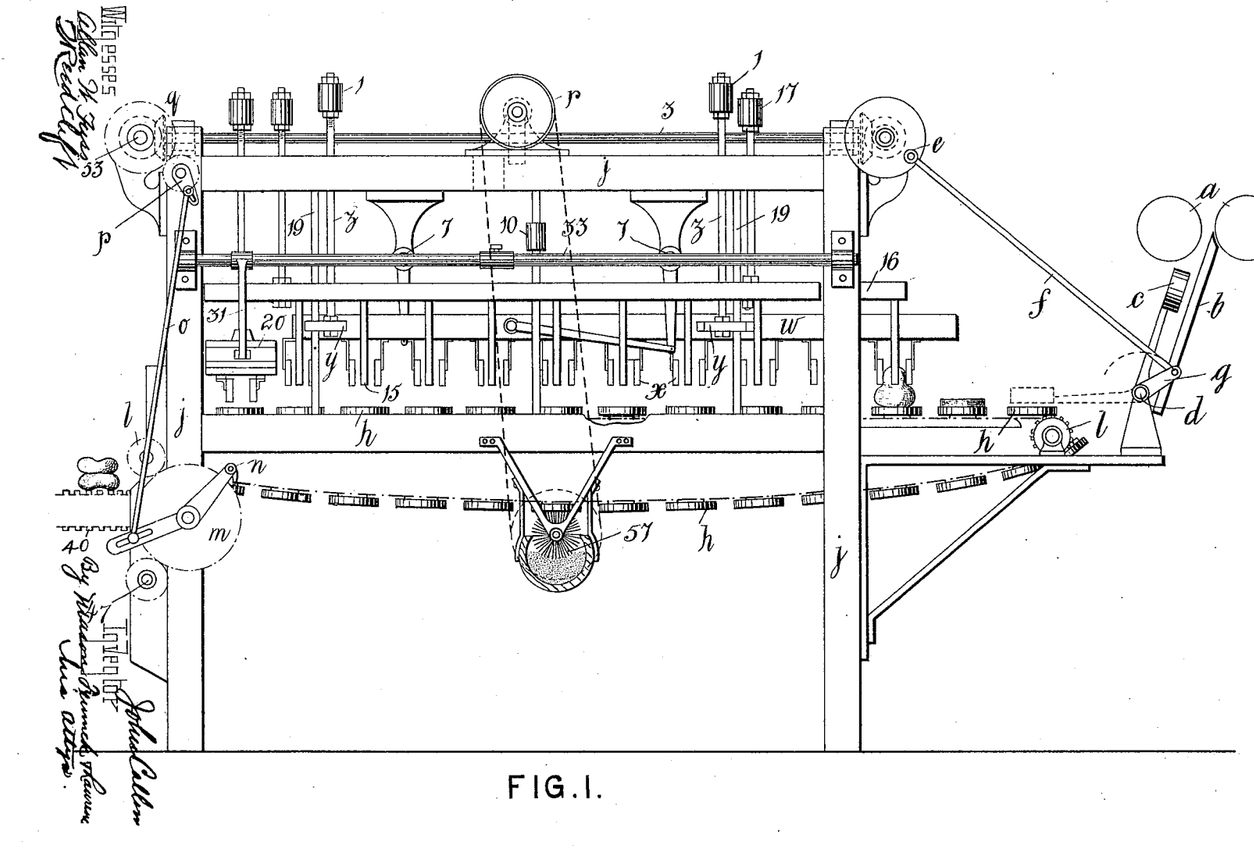
Figure 1 is a side elevation of my apparatus with some parts not shown for the sake of clearness.
Figure 2:
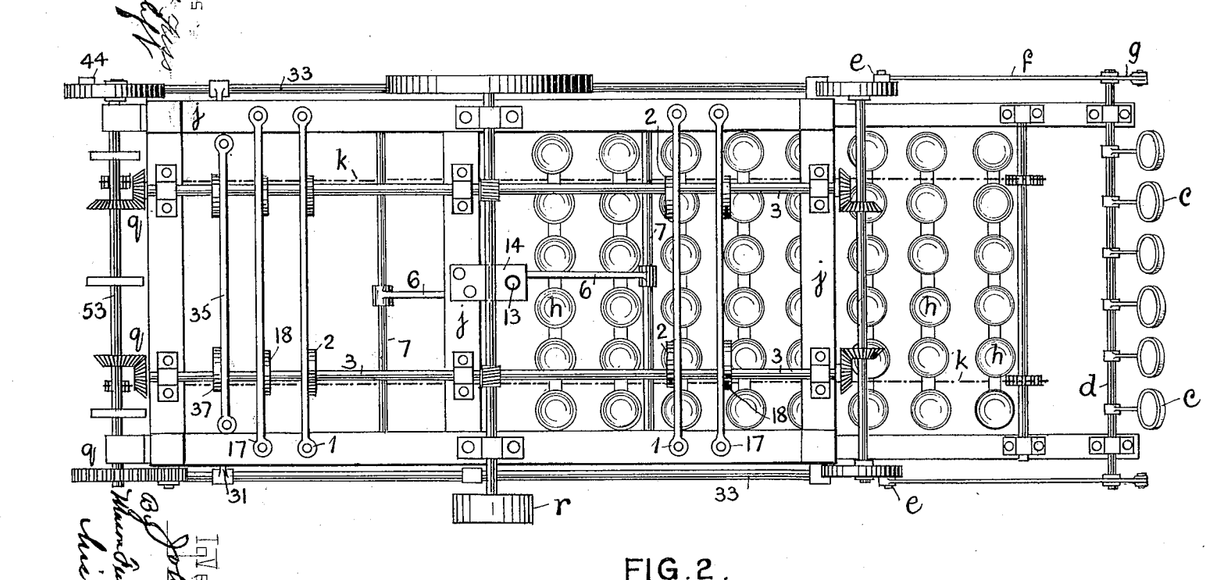
Fig. 2, a plan of a portion of the same.
Figures 2A, 8:
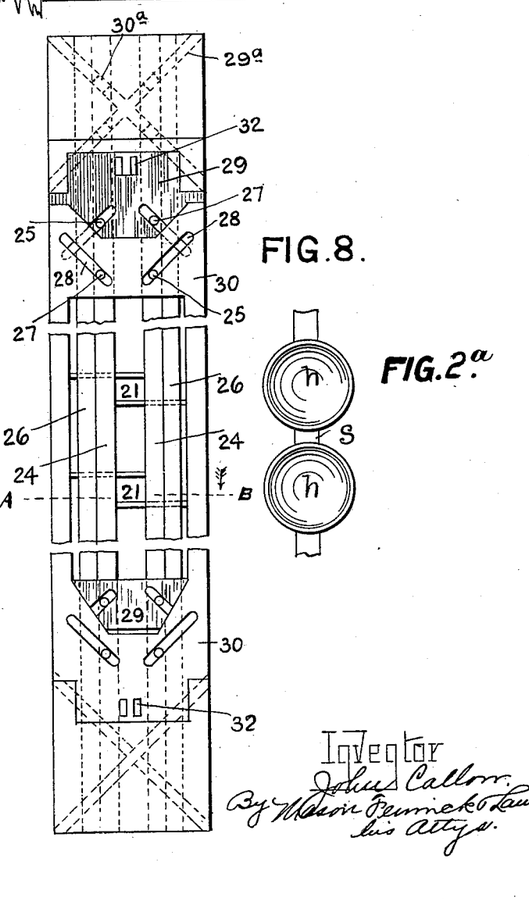
Fig. 8, a plan of the same.
Figure 3:
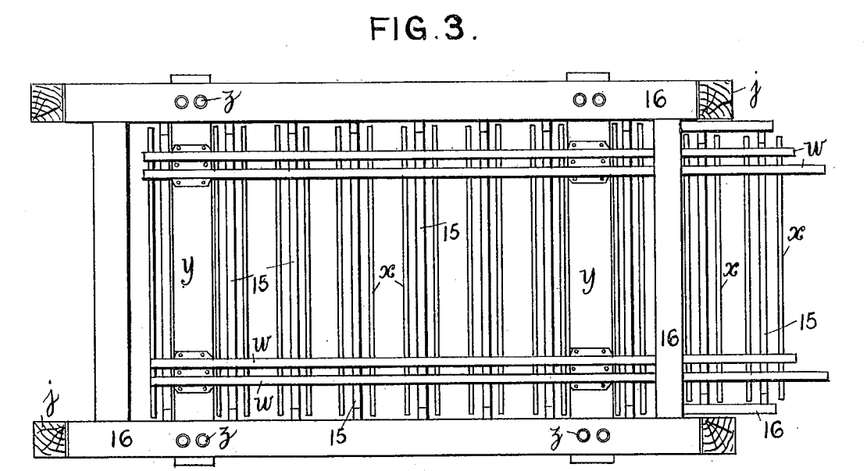
Fig. 3, another plan showing parts not shown in Fig. 2.
Figure 4:
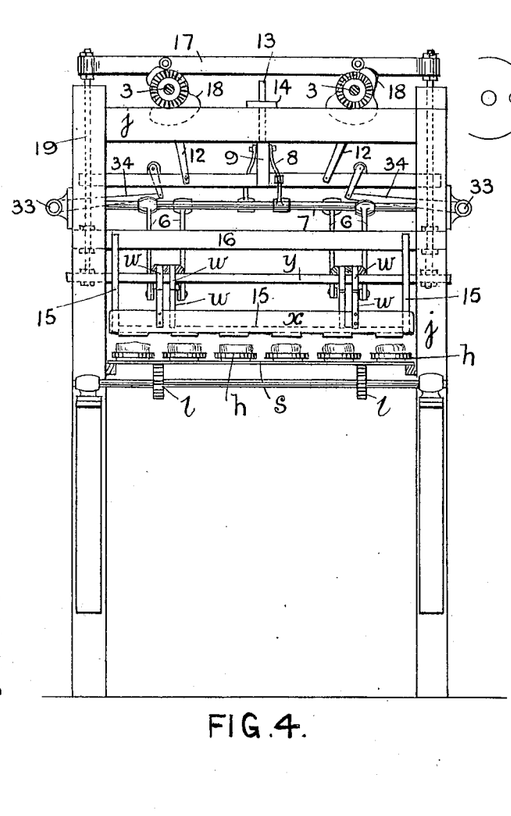
Fig. 4, an end view of Fig. 1 as seen from the feed end of the machine.
Figure 5:
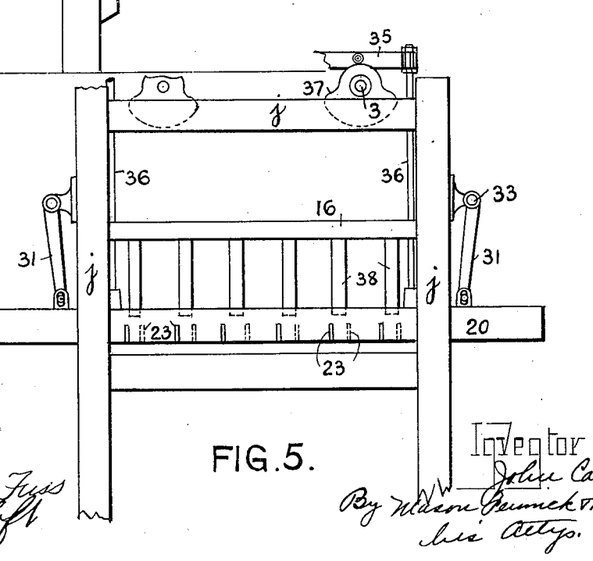
Fig. 5, a part end view as seen from the delivery end.
Figure 6:
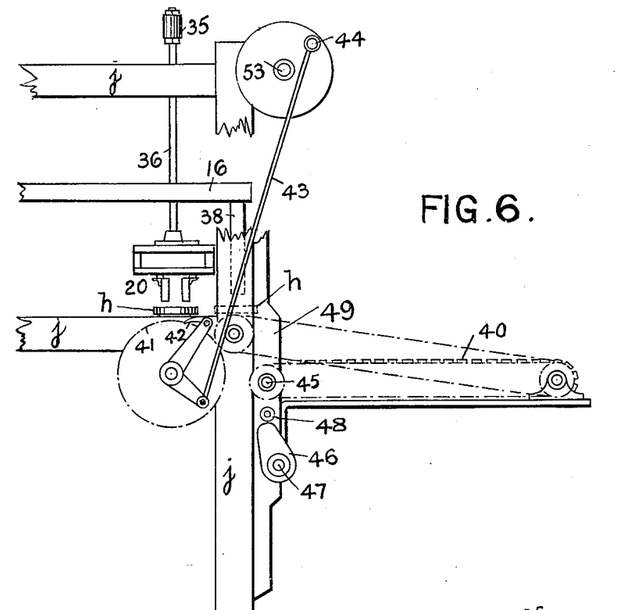
Fig. 6, a part side elevation of the delivery end of the apparatus as seen from the back side of the machine.
Figures 7, 9:
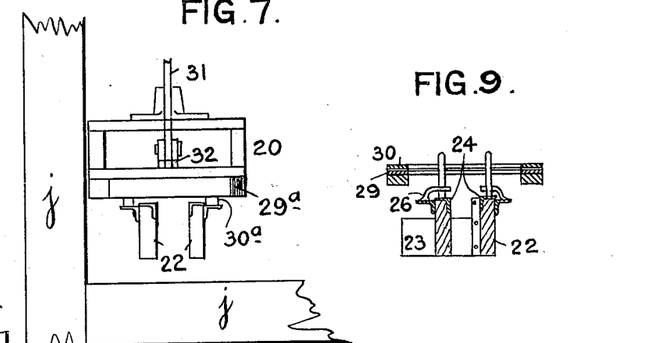
Fig. 7, a side elevation of a portion of Fig. 1, enlarged.
Fig. 9, a cross-section on dotted line A B of Fig. 8.
Figure 10:
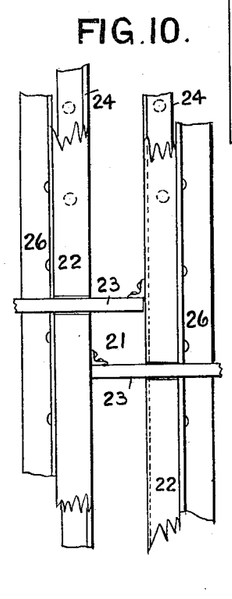
Fig. 10, an underneath plan view of a portion of Fig. 8, still further enlarged.
Figure 19:
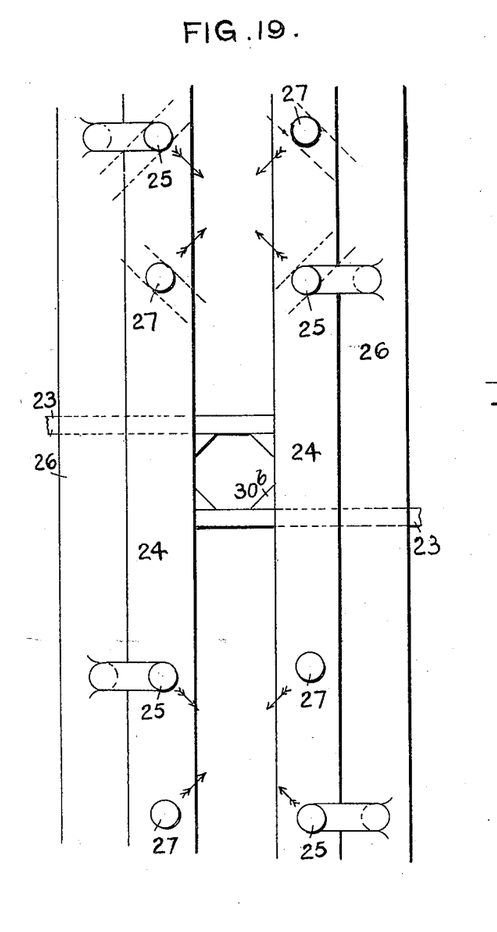
Figs. 19 and 20, details of apparatus shown in Figs. 8, 9, and 10.
Figure 20:
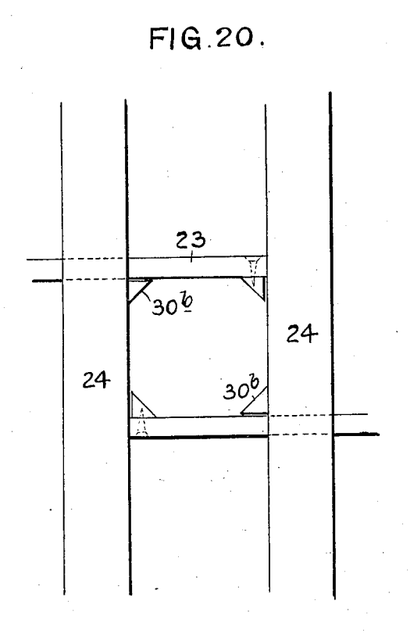

The method of reducing or enlarging the squares is as follows: Longitudinal strips or laths 22, extending the full length of the frame, form two sides of each square, cross-pieces 23, arranged at right angles to the longitudinal strips 22, forming the other two sides. Along the tops of the strips 22 are angle-pieces 24, adapted to slide in a direction opposite to that of the strips 22, pins 25 being fixed to the latter by means of angle-irons and lugs 26, so as to bring them in line with pins 27, fixed to the angle-irons 24. The cross-pieces 23 may be attached to the latter by angle-iron strips, as shown in Fig. 10. All the pins pass through inclined slots 28 in sliding plates 29 and 30, arranged one underneath the other, those marked 27 moving in opposite directions and those marked 25 in opposite direction, and owing to the inclined slots the pins are caused to approach to or recede from each other as the sliding plates 29 and 30 are pushed in or drawn out. In addition to the inclined slots I also provide grooves 29$^a$, arranged at the same angles as the slots, and have blocks 30$^a$ sliding in such grooves and attached to the same pieces as the pins. Now, supposing it is desired to reduce the size of the squares, the plates 29 and 30 will be moved inward in opposite directions, the pins 27, which are fixed to the angle-iron 24 and which have fixed to them the cross-pieces 23, will be moved in the direction of the arrows, Fig. 19, so as to approach each other diagonally, taking the cross-pieces with them, and the pins 25, fixed to the pieces 22, which form the other sides of the square, will be moved so as to approach each other diagonally, and consequently the four sides will be closed in simultaneously. By placing triangular pieces 30$^b$ as shown in Figs. 19 and 20 an octagon will be formed when the sides are drawn as close as is required; but they assume the position shown in Fig. 20 when drawn out a little. The reciprocatory horizontal movement is given to the plates 29 and 30 by means of rods 31, connected to lugs 32 thereon and to a shaft 33, Figs. 5 and 12, to which a rotary movement is imparted by levers 34, actuated by cross-bar 10, which, as before stated, is reciprocated vertically by eccentrics 12, the vertical movement of the frame being given by cross-bar 35 and vertical rods 36, actuated by cams 37, keyed on shafts 3. Immediately over each square mold is a plunger 38, which moves with the frame 16 and at a given time presses on the top of the dough being operated upon, a further set of plungers 39, Fig. 13, being provided, which after the dough leaves the molds presses it down into the shape shown. The lumps of shaped dough are afterward deposited onto a traveling band or table 40, Figs. 13 and 6, driven by gearing 41, 42, 43, and 44, so as to move intermittently; but to prevent the bowls $h$ scraping the dough as they pass underneath the shaft 45, which supports one end of the band or table, is capable of being lowered directly the dough is deposited thereon. This is done by means of cams 46, one on each side of the machine, keyed on shaft 47, gearing with wheel $m$, Fig. 1, which cam bears against a roller 48, which, with the axle 45, is carried by a sliding piece 49. In Fig. 6 the table is shown in its highest position. In order that the dough may be deposited in exactly the right position on the table, a frame 50, Figs. 13 and 14, is provided, having transverse partitions 51, such frame being lowered into position in time to receive the lumps of dough and afterward raised to allow of the dough, which is now in the shape of a loaf, being moved along. The frame is raised by a cam 52, keyed to shaft 53. Furthermore, on the same shaft is another cam 54, designed to operate by means of a lever 55 a series of bashers 56, which are caused to descend at the proper time and bash the loaves, as shown in dotted lines, Fig. 13, after which operation the loaves are ready for baking. The bowls as they travel back to receive more dough are dusted with flour by means of a revolving brush 57, Fig. 1.

The mode of action of the whole apparatus is as follows: The cutters $c$ as the dough leaves the rollers $a$ cut out each a piece of a given size and weight and deposit it onto an endless band $i$, Fig. 18, whence they are conveyed by a series of such bands to a row of bowls $h$ to be molded into shape. This gives the dough time to aerate or prove after the squeezing action of the rollers. The lumps of dough deposited on the bowls now travel forward until they arrive underneath rams 15, attached to the frame 16, which has been raised by cams, as before described, to allow of this. The strips or laths $x$, carried by frames $w$, now close in against the dough on each bowl, ascending at the same time. When nearing the top, the rams 15 descend and press into the dough, as shown in the drawings, Figs. 1 and 13, after which they ascend to allow of the laths $x$ coming closer together, and in order to prevent the dough sticking thereto as the laths separate again the rams again descend, so as just to graze the insides of the laths. The row of pieces of dough now move along to the next series of laths and rams to undergo the same treatment; but while traveling between the two each piece of dough has been turned, so as to present another surface to be operated upon, and so on, until all the sides have been treated. Each bowl now comes underneath the frame 20, having a number of square molds, which surround each piece of dough on all sides, and by means of mechanism hereinbefore described the four sides of each square are closed in against the dough and at the same time caused to ascend, thereby giving the shape required to each piece of dough. It only remains now for the plungers 39, Fig. 13, which descend after the bowls have passed from underneath the frame of molds, to complete the shape. In the case of loaves formed of two pieces of dough, as in cottage loaves, the conveyer 40 is moved forward only after every second delivery of the material, so that in each case two lumps of dough will be deposited one on top of the other, as shown in Fig. 13.

It will be evident that by means of the frame with square molds, which operate on all sides of the dough simultaneously, the slow method of operating on one side only could be dispensed with; but as they serve the purpose of expelling the gases I therefore retain them.

I declare that what I claim is—

1. In a machine or apparatus for molding dough, pastry or like material, the combination with a series of compressing-rollers by which dough is drawn out into a sheet of uniform thickness, a sloping board or screen over which the dough is conveyed and traveling trays or bowls of one or more circular, square or otherwise shaped cutters pivotally mounted adapted to cut lumps of any desired size and weight out of the sheet of dough as it issues from the rollers down said sloping board or screen and to convey such lumps to the trays or bowls to be molded, and the means whereby such cutters are operated substantially as set forth.

2. In an apparatus for molding dough, pastry or like material, the combination with a series of compressing-rollers feeding the dough, and one or more cutters cutting lumps of dough of any required size and weight, of a series of rotatable trays or bowls to receive the dough from the cutters, such bowls having a toothed wheel adapted to engage with pins fixed to the framework and an endless band or chain carrying said bowls having an intermittent movement, whereby the bowls as they travel along are caused to turn through a part of a revolution substantially as set forth.

3. In an apparatus for molding dough, pastry or like material, the combination with a traveling band or chain, a number of rows of rotatable bowls carried thereby and containing lumps of dough, of a pair of frames $w$ having a reciprocating vertical movement and also a reciprocating horizontal movement, each piece of a pair moving in opposite directions horizontally and each piece having suspended therefrom a series of laths arranged in couples, alternative laths being attached to the same piece of the frame, those attached to one piece alternately moving toward and away from those attached to the other piece and the means for operating the frames substantially as set forth.

4. In an apparatus for molding dough, pastry or like material, the combination with the traveling endless chain $k$ carrying bowls $h$ and frames $w$ with laths $x$, of a second frame 16 having a reciprocating vertical movement only, and having attached thereto a series of rams extending right across the machine and moving vertically between the pairs of laths $x$ and the means employed whereby such rams at one time press down on the dough and are afterward drawn up to allow of the laths closing in and again descending to prevent the dough sticking to the laths as they move away from each other substantially as set forth.

5. In a machine for molding dough, pastry or like material, the combination with an endless traveling band, bowls carried thereby containing dough, and frames $w$ and 16 carrying laths $x$ and rams 15 by which the gases are expelled from the dough, and the latter is pressed into the required shape, of a frame carrying a series of molds which, as the bowls with the dough travel along and stop underneath the frame, inclose said dough on all sides and as the frame containing the molds ascends, the sides of each mold are gradually drawn in, thereby reducing the size of such molds, and a series of plungers 38 carried by frame 16 whereby the dough is pressed down on the top at the proper time substantially as set forth.

6. A series of molds consisting of two longitudinal pieces 22 which form the two sides of each square, cross-pieces 23 which form the other two sides, angle-pieces 24 to which the cross-pieces are attached and which angle-pieces are adapted to slide along the tops of pieces 22, pins 27 fixed to angle-pieces 24 and pins 25 fixed to angle-pieces 26 which move with longitudinal pieces 22, sliding plates 29 and 30 having inclined slots engaging the pins 27 and 25 and means for moving such plates in opposite directions horizontally and for moving the frame vertically substantially as set forth.

7. In a machine for molding dough, pastry or like material, the combination with the traveling chain $k$, bowls $h$, frames $w$ and 16 with their connections and the frame of molds and plunger 39 of a second traveling endless band 40 onto which the lumps of dough after leaving the square molds and being pressed down by plunger 39 to complete the shaping are deposited, such endless band being mounted at one end on an axle capable of being moved vertically, and having resting on the top a frame with a number of partitions corresponding with the number of loaves in a row being shaped, such frame being lowered into position to receive each shaped piece of dough as they drop out of the bowls and afterward raised again to be clear of the loaf as it moves along to be finally bashed as set forth.

8. In a bread-making machine the cutters $c$ and the molder, a series of traveling bands interposed between said cutters and molder along which the dough travels before being deposited on the trays of the molder, whereby the dough has time to aerate or prove after the squeezing action of the rollers $a$.

9. In a machine for molding bread, pastry or like material, the combination of the frame $w$, the laths $x$ hinged thereto and provided with projecting strips $x'$ and the rams 15 arranged to strike said strips as they ascend, substantially as set forth.

10. The combination of rollers $a$, sloping board $b$, cutters $c$, endless bands $i$, rotatable or bread bowls $h$, traveling chain $k$, frames $w$ with laths $x$, frames 16 with rams 15, frame of square molds 20, plungers 38 and 39, traveling table 40, movable frame 50, bashers 56, rotary brush 57 for dusting the bowls $h$ with flour and the means by which the various parts are operated substantially as set forth.

In witness whereof I have hereunto signed my name, this 4th day of November, 1899, in the presence of two subscribing witnesses.

JNO. CALLOW.

Witnesses:
G. C. DYMOND,
W. H. BEESTON.